Aug. 3, 1965 W. POLLAK 3,198,032
HANDLE
Filed July 20, 1962

INVENTOR.
Walter Pollak
BY
W. S. Pettigrew
ATTORNEY

United States Patent Office 3,198,032
Patented Aug. 3, 1965

3,198,032
HANDLE
Walter Pollak, Detroit, Mich., assignor to General Motors Corporation, Detroit, Mich., a corporation of Delaware
Filed July 20, 1962, Ser. No. 211,180
3 Claims. (Cl. 74—545)

This invention relates to handles, and more particularly to safety handles.

Handles are generally provided in vehicle passenger compartments to operate various mechanisms such as window regulators and door locks. A typical handle comprises a hub member adapted to operate the mechanism the handle is associated with, a crank member attached to the hub member, and a knob member attached adjacent the free end of the crank and projecting therefrom. This typical configuration presents a safety hazard to the passenger, since the passenger could, due to accident or otherwise, engage himself with the projecting knob member and cause himself serious injury.

The primary object of this invention is to provide a safety handle including a collapsibly mounted knob member which will retract from its projecting relationship with respect to the member that it is mounted upon when struck with minimal force by the passenger, thus reducing the likelihood that a passenger would injure himself on the handle, and also reducing the amount of injury inflicted should such injury take place.

This and other objects of the invention will be more readily apparent from the following specification and drawings wherein.

Figure 1:
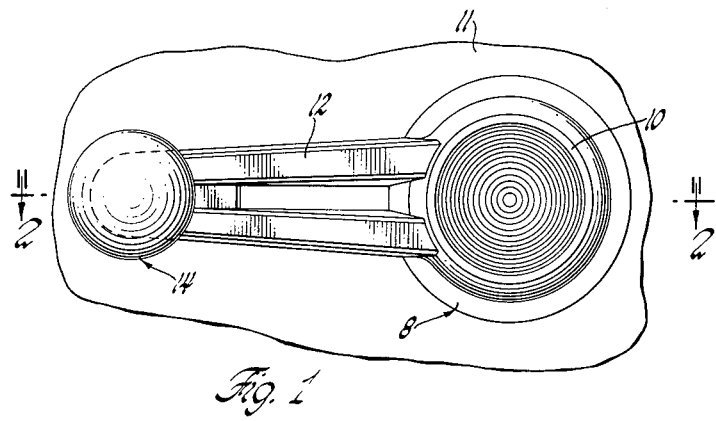
FIGURE 1 is a side elevational view of a handle according to this invention.
Figure 2:
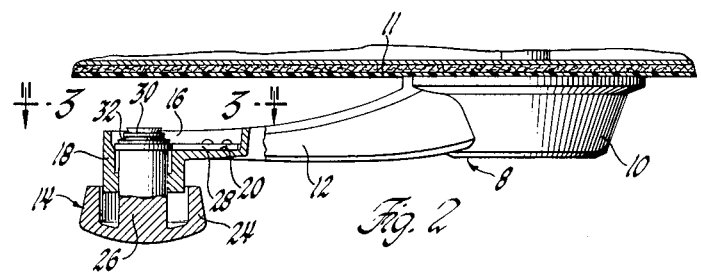
FIGURE 2 is a partial sectional view taken generally along the plane indicated by line 2—2 of FIGURE 1.

Referring now to the drawings, a handle 8 comprises a hub portion 10 pivotally mounted on an inner vehicle wall 11, a crank or mounting member 12 projecting from the hub, and a knob member 14 mounted on the free end of the crank. As shown in FIGURE 2, crank member 12 incorporates adjacent its free end a recess 16. An apertured shouldered boss 18 extends from the member 12 and opens to the base wall 20 of recess 16. Knob member 14 includes a skirt 24 and a shank 26 slidably received within boss 18, FIGURE 4. An elongated deformable support member 28 includes an aperture adjacent one end thereof which is slidably received on a reduced diameter portion of shank 26 and is rotatably secured to the shank by peening the end of the shank over a flat washer 30 and a Belleville washer 32. Support member 28 is releasably secured adjacent its other end to the crank at base wall 20 of recess 16 by means of the bent over tabs 34.

Figure 4:
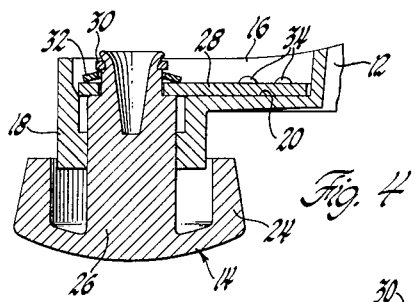
FIGURE 4 is an enlarged sectional view of a portion of FIGURE 2, showing the knob in its normal relation to the handle.
Figure 3:
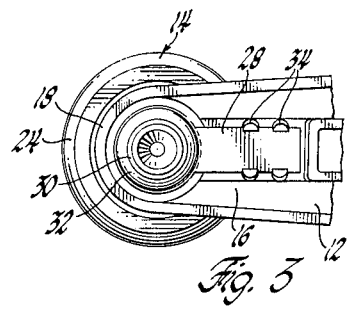
FIGURE 3 is an enlarged view taken generally along the plane indicated by line 3—3 of FIGURE 2.
Figure 5:
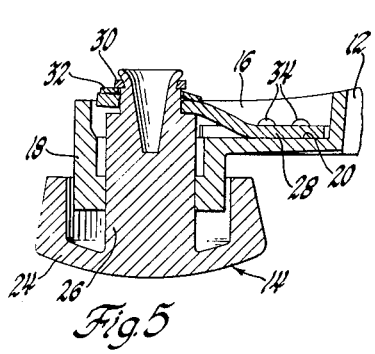
FIGURE 5 is a view similar to FIGURE 4, showing the knob partially retracted.
Figure 6:
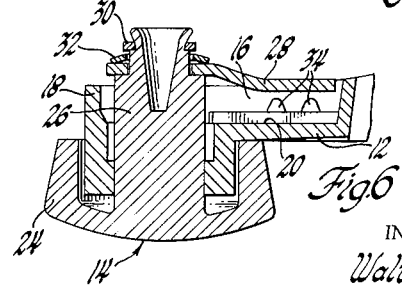
FIGURE 6 is a view similar to FIGURE 4, showing the knob released from the crank portion of the handle.

Referring now particularly to FIGURES 4, 5 and 6, FIGURE 4 shows the knob 14 in its normal projected relation with respect to crank 12. FIGURE 5 shows the result of a force being applied to knob member 14. The knob has partially retracted from its projecting relationship with respect to the mounting member 12 through the deformation of the support member 28 about its releasable securement. The tabs 34 are constructed to fail upon the application of a predetermined force. Any force, less than a predetermined force, applied to the knob in a direction generally along the longitudinal axis of shank 26 will cause shank 26 to move within boss 18 as support member 28 deforms, but only to the point of ultimate strength of the bent over tabs 34, such point being the application of aforesaid predetermined force, whereupon (FIGURE 6) support member 28 will be released from crank member 12 and allow shank 26 to slide further within boss 18 until the edge of the skirt 24 rests against the outer exposed surface of the crank 12.

While I have shown and described one embodiment of my invention, it is capable of many modifications. Changes, therefore, in the construction and arrangement may be made without departing from the spirit and scope of my invention.

What is claimed is:

1. A handle comprising: a crank member, a knob member projecting from an end portion of said crank member in slidable telescopic relation therewith, a resilient deformable support member having said knob member secured thereto, and frangible means releasably securing said support member to said crank member, said securing means being frangible to release said support member from said crank member upon the application of a predetermined force to said knob member and permit said knob member to telescope toward said crank member, a force less than said predetermined force on said knob member causing said support member to resiliently deform and telescope said knob member toward said crank member.

2. A handle comprising: a crank member having an apertured boss adjacent an end thereof, a knob member projecting from said crank member and having a shank slidably received within said apertured boss, a deformable elongated support member having said shank secured thereto adjacent one end thereof, tab means releasably securing said mounting member adjacent the other end thereof to said crank member, said tab means being constructed to fail upon the application of a predetermined force to said knob member and to release said support member from said crank member to permit said shank to slide in said apertured boss and move said knob member toward said crank member; the application of a force less than said predetermined force causing said support member to deform and move said shank within said apertured boss to move said knob member toward said crank member.

3. A handle comprising, a mounting member, a resilient deformable member, releasable means securing said deformable member to said mounting member, and a knob member adapted to be mounted for movement toward and away from said mounting member, said knob member being mounted on said deformable member at a location spaced from said means and projecting with respect to said mounting member, said means releasing said deformable member upon the application of a predetermined force to said knob member to permit movement of said knob member toward said mounting member, the application of a force to said knob member less than said predetermined force causing said deformable member to resiliently deform and permit movement of said knob member toward said mounting member.

References Cited by the Examiner

UNITED STATES PATENTS

| | | | |
|---|---|---|---|
| 250,165 | 11/81 | Palmer | 74—546 |
| 391,992 | 10/88 | Turner | 74—548 X |
| 524,522 | 8/94 | Bourne | 74—546 |
| 543,135 | 2/95 | Brachhausen et al. | 64—29 |
| 602,262 | 4/98 | La France. | |
| 1,261,890 | 4/18 | Akeley | 74—545 |
| 1,367,359 | 2/21 | Divine | 74—547 |
| 1,484,729 | 2/24 | McCain | 74—485 |
| 2,094,584 | 10/37 | Cox | 74—548 X |
| 2,142,766 | 1/39 | Sinko | 74—557 |
| 2,445,211 | 7/48 | Drake | 74—553 |
| 2,895,345 | 7/59 | McClure | 74—493 |
| 3,071,023 | 1/63 | Herr et al. | 74—545 |
| 3,109,312 | 11/63 | Haupt | 64—28 X |

FOREIGN PATENTS 553,149  12/56  Italy.

BROUGHTON G. DURHAM, *Primary Examiner*.